United States Patent
Ito

(10) Patent No.: US 6,675,191 B1
(45) Date of Patent: Jan. 6, 2004

(54) METHOD OF STARTING EXECUTION OF THREADS SIMULTANEOUSLY AT A PLURALITY OF PROCESSORS AND DEVICE THEREFOR

(75) Inventor: Yoshiyuki Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/573,008

(22) Filed: May 18, 2000

(30) Foreign Application Priority Data

May 24, 1999 (JP) .......................................... 11-142881

(51) Int. Cl.[7] .............................................. G06F 9/00
(52) U.S. Cl. ....................... 709/102; 709/100; 709/106; 710/260; 712/220
(58) Field of Search ................................ 709/100, 101, 709/102, 103, 104, 105, 106, 107, 108; 710/260; 712/220

(56) References Cited

U.S. PATENT DOCUMENTS

| | | | | |
|---|---|---|---|---|
| 5,179,702 A | * | 1/1993 | Spix et al. | 709/102 |
| 5,339,415 A | * | 8/1994 | Strout, II et al. | 709/102 |
| 5,481,719 A | * | 1/1996 | Ackerman et al. | 709/108 |
| 5,515,538 A | * | 5/1996 | Kleiman | 710/260 |
| 6,035,321 A | * | 3/2000 | Mays | 709/103 |
| 6,195,676 B1 | * | 2/2001 | Spix et al. | 709/107 |
| 6,269,391 B1 | * | 7/2001 | Gillespie | 709/100 |
| 6,513,057 B1 | * | 1/2003 | McCrory | 709/102 |

FOREIGN PATENT DOCUMENTS

JP          9-319653          12/1997

OTHER PUBLICATIONS

"Multithreading With Distributed Functional Units", Bernard K. Gunther, 1997, IEEE.*

Context Management and Its Applications on Distributed Transactions:, George Samara, Ajay D. Kshemkalyani, and Andrew Citron, IBM Corporation, 1996, IEEE.*

Uresh Vahalia, UNIX Internals The New Frontiers, Prentice Hall, pp. 130–139, 1996.

Bill Luis and Daniel Berk, Guidance to Multi–thread Programming, ASCII Publishing, pp. 73–77, Sep. 1996.

A.S. Tanenbaum, "Basics and Application of OS", Prentice Hall Toppan Company, 2nd paragraph pp. 38–65.

* cited by examiner

*Primary Examiner*—Majid Banankhah
(74) *Attorney, Agent, or Firm*—McGinn & Gibb, PLLC

(57) ABSTRACT

In a multi-processor system in which a plurality of threads to be simultaneously executed at a plurality of processors are stored as one thread set at a context area one-to-one corresponding to a thread set provided in a context save area on a main storage, the method of enabling a plurality of processors to start execution of threads simultaneously, in which exclusive arbitration is conducted during exception processing so as to temporarily allow only one processor among the plurality of processors constituting the multi-processor system to obtain kernel scheduler execution authority, and a processor obtaining kernel scheduler execution authority selects a thread set to be executed next and controls such that a plurality of threads in the selected thread set are executed simultaneously at a plurality of processors including its own processor.

24 Claims, 9 Drawing Sheets

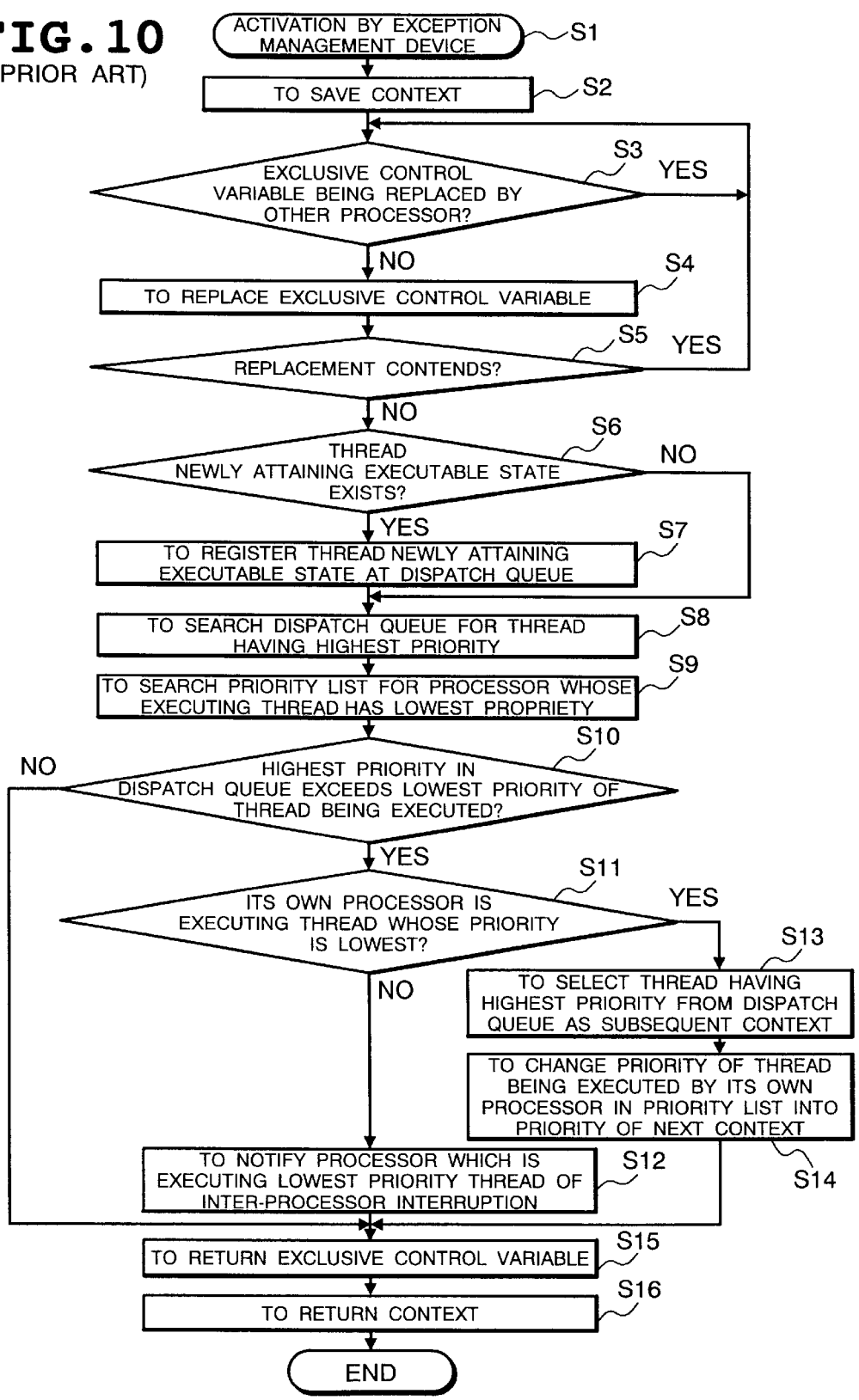

METHOD OF STARTING EXECUTION OF THREADS SIMULTANEOUSLY AT A PLURALITY OF PROCESSORS AND DEVICE THEREFOR

BACKGROUND OF THE INVENTION

1. Field of the Invention

The present invention relates to a technique of starting execution of threads simultaneously at a plurality of processors at the time of thread context switching in a multi-processor system and, more particularly, to a technique of handling a plurality of thread execution states at a plurality of processors, that is, a plurality of thread contexts, as a single unit.

2. Description of the Related Art

As an example of a conventional kernel scheduler at a plurality of processors, handling of threads in Solaris is recited in "Uresh Vahalia: UNIX Internals The New Frontiers, Prentice Hall, pp. 130–139, 1996" and "Bill Luis and Daniel Berk: Guidance to Multi-thread Programming, ASCII Publishing, pp. 73–77, September 1996". Unit for exclusive control among a plurality of processors is described in "A. S. Tanenbaum: Basics and Application of OS, Prentice Hall Toppan Company, 2nd chapter, 2nd paragraph. An example of a multi-processor system which executes a plurality of generated tasks in parallel to each other is recited in Japanese Patent Laying-Open (Kokai) No. Heisei 9-319653.

As shown in FIG. 9, structure of the conventional kernel scheduler having the minimum number of processors includes an input device 1, a first processor 27, a second processor 28, an inter-processor interruption notification device 29, a main storage 3 and an output device 4.

Further included are in the first processor 27, an exception management device 271, and an interruption processing unit 272 and a kernel scheduler unit 273 executed by the first processor 27, in the second processor 28, an exception management device 281, and an interruption processing unit 282 and a kernel scheduler unit 283 executed by the second processor 28, and on the main storage 3, an exclusive control variable 31, a context save area 32, a dispatch queue 33 and a priority list 38.

FIG. 10 is a flow chart showing operation of the interruption processing units 272 and 282 and the kernel scheduler units 273 and 283 of FIG. 9.

Operation of thus structured conventional kernel scheduler will be described in the following with reference to FIGS. 9 and 10.

Assume that a processor which receives an exception applied through the input device 1 is the first processor 27, a first exception factor 11 is received by the exception management device 271 of the first processor 27 to activate the interruption processing unit 272 (Step S1).

In the interruption processing unit 272, a context save unit 2723 is called and an execution state of the first processor 27, that is, a context, is saved, assuming that a currently executed thread is the first thread, as a context 321 of the first thread in the context save area 32 (Step S2).

The interruption processing unit 272 subsequently activates the kernel scheduler unit 273, where an exclusive arbitration unit 2731 is first executed. If the second processor 28 has changed the exclusive control variable 31, the unit 2731 waits (Step S3) and otherwise, rewrites the exclusive control variable 31 to prevent other processors from accessing an area of the dispatch queue 33 or the like necessary for the subsequent operation (Steps S4 and S5).

Subsequently, a dispatch queue operation unit 2732 in the kernel scheduler unit 273 determines whether there exists a thread newly attaining an executable state by the first exception factor 11 and the processing by the interruption processing unit 272 (Step S6) and when the thread exists, the unit 2732 registers a structure or an ID number indicative of the thread at the dispatch queue 33 (Step S7). The example of FIG. 9 shows a state where the first processor 27 registers a structure 333 indicative of a third thread as a priority "115". It is assumed here that the larger the value is, the higher the priority is.

Furthermore, an object to be activated selection unit 2733 searches the threads waiting at the dispatch queue 33 for a thread having the highest priority (Step S8) and searches the priority list 38 for a processor whose executing thread has the lowest priority (Step S9). In the example of FIG. 9, this search obtains the third thread having the priority "115" from the dispatch queue 33 and the second processor being executing the priority "100" from the priority list 38.

Next, the object to be activated selection unit 2733 determines whether the priority "115" of the structure 333 indicative of the third thread which is the highest priority among the threads waiting at the dispatch queue 33 exceeds the priority "100" of the thread being executed by the second processor which is the lowest priority in the priority list 38 (Step S10). In this case, the former priority exceeds the latter, the unit 2733 further determines whether its own processor is executing the lowest priority thread or not (Step S11). In this case, the processor is not executing the thread in question. In such a case as this where a priority of a thread waiting at the dispatch queue 33 is higher than a priority of a thread being executed at other processor, an inter-processor interruption unit 2734 gives a notification to a processor which is executing the lowest priority thread by using an inter-processor interruption (Step S12). In the example of FIG. 9, the second processor 28 is to be notified.

The first processor 27, after giving a notification using an inter-processor interruption, releases exclusive conditions by restoring the exclusive control variable 31 to an original state (Step S15) and returns the context to move onto a state prior to generation of the first exception factor 11. In the example of FIG. 9, the processor will return to the original first thread.

On the other hand, at the processor 28 to be notified of an inter-processor interruption, the exception management device 281 of the second processor 28 is given a notification of an inter-processor interruption by the inter-processor interruption notification device 29 to activate the interruption processing unit 282.

In the interruption processing unit 282, similarly to the interruption processing unit 272 which has processed the first exception factor 11, a context save unit 2823 is called to save an execution state of the second processor, that is, a context of the second thread, as a context 322 of the second thread in the context save area 32 (Step S2).

The interruption processing unit 282 activates the kernel scheduler unit 283, where an exclusive arbitration unit 2831 is first executed. When other processor has changed the exclusive control variable 31 in such a case where processing of the kernel scheduler unit 273 at the first processor 27 is yet to be completed or the like, the unit 2831 waits (Step S3) and otherwise, the unit changes the exclusive control variable 31 to prevent other processors from accessing an area of the dispatch queue 33 or the like necessary for subsequent operation (Steps 4 and 5).

Subsequently, a dispatch queue operation unit 2832 in the kernel scheduler unit 283 determines whether there exists a thread newly attaining an executable state by the processing by the inter-processor interruption notification device 29 and the interruption processing unit 282 (Step S6) and when the thread exits, the unit 2832 additionally registers the context from the context save area 32 at the dispatch queue 33 (Step S7).

In the example of FIG. 9, it is assumed that there exists no thread which newly attains an executable state after the structure 333 indicative of the third thread is registered by the first processor 27.

Furthermore, an object to be activated selection unit 2833 searches the threads waiting at the dispatch queue 33 for a thread having the highest priority (Step S8) and also searches the priority list 38 for a processor whose executing thread has the lowest priority (Step S9). In the example of FIG. 9, this search obtains the third thread having the priority "115" from the dispatch queue 33 and the second processor which is executing the priority "100" from the priority list 38.

Next, the object to be activated selection unit 2833 determines whether the priority "115", of the structure 333 indicative of the third thread which is the highest priority among the threads waiting at the dispatch queue 33 exceeds the priority "100" of the thread being executed by the second processor which is the lowest priority in the priority list 38 (Step S10). In this case, since the former priority exceeds the latter, the unit 2833 further determines whether its own processor is executing the lowest priority thread or not (Step S11). In this case, the processor is executing the thread in question. In such a case as this where a priority of a thread waiting at the dispatch queue 33 is higher than a priority of a thread being executed at other processor, the object to be activated selection unit 2833 selects the third thread having the highest priority among those waiting at the dispatch queue 33 as a context of a thread to be executed next (Step S13) and changes the priority of the thread being executed by its own processor in the priority list 38 into a priority of the next context (Step S14).

Lastly, the second processor 28 releases exclusive conditions by restoring the exclusive control variable 31 to an original state (Step S15) and reads the next context to move on to execution of a new thread, that is, the third thread.

As described above, in the conventional art, each kernel scheduler unit at each processor detects a thread to be executed next based on its priority and the kernel scheduler units are activated by means of an inter-processor interruption notification device, thereby realizing activation processing of a plurality of threads among a plurality of processors. Such conventional method has the following problems.

The first problem is that it is impossible to exactly determine to which thread and when a thread being executed by each processor is switched among the processors unless a synchronization unit is provided in addition to a kernel scheduler unit.

More specifically, in conventional art, a kernel scheduler unit operating at each processor operates basically independently of each other. The kernel scheduler unit is allowed to cope with a plurality of processors by adding, to a basic function of shifting execution when a priority accommodated in a thread structure on a dispatch queue is higher than a priority of a thread being executed, a function of requesting execution of a new thread by means of an inter-processor interruption notification device when there exists other processor whose executing thread has a lower priority and further adding an exclusive arbitration unit for preventing operation of the dispatch queue or the like from contending. Therefore, even when the kernel scheduler unit at a certain processor requests execution of a new thread from other processor, another high-priority thread might be registered at a dispatch queue at the requested processor, so that after making the request, the requesting-side processor needs to monitor which thread is actually activated at the requested processor by means of a synchronization unit provided in addition to the kernel scheduler unit.

When in the middle of the monitoring of the requested processor by the requesting-side processor, other processor makes a request to the requesting processor for activation of another thread, a thread having a priority to be executed might be kept waiting for a long time unless the requesting side processor accepts the request. It is accordingly a conventional practice that at the monitoring of a requested processor, a kernel scheduler unit at a requesting-side processor is completed to again conduct monitoring by other unit than the kernel scheduler unit at a state of receiving an inter-processor interruption request.

The second problem is that when operation of a thread executed at each processor is to be synchronized with each other, an overhead in synchronization processing is increased.

The reason is that for activating a thread to be synchronized, the above-described monitoring mechanism should be used in addition to the activation of a thread by a kernel scheduler unit in terms of the first problem.

SUMMARY OF THE INVENTION

An object of the present invention is therefore enabling execution of threads designated by a plurality of processors to be started simultaneously at the switching of threads executed among the respective processors.

Another object of the present invention is to manage a plurality of threads as one unit to enable execution of threads of the same unit to be started simultaneously at a plurality of processors.

According to the first aspect of the invention, in a multi-processor system in which a plurality of threads to be simultaneously executed at a plurality of processors are stored as one thread set at a context area one-to-one corresponding to a thread set provided in a context save area on a main storage, a method of enabling a plurality of processors to start execution of threads simultaneously, wherein exclusive arbitration is conducted during exception processing so as to temporarily allow only one processor among the plurality of processors constituting the multi-processor system to obtain kernel scheduler execution authority, and a processor obtaining kernel scheduler execution authority selects a thread set to be executed next and controls such that a plurality of threads in the selected thread set are executed simultaneously at a plurality of processors including its own processor.

In the preferred construction, at the exclusive arbitration, a processor failing to obtain kernel scheduler execution authority prepares and waits for reception of an inter-processor interruption from a processor obtaining kernel scheduler execution authority and when receiving an inter-processor interruption, sets such that an exception reoccurs after thread switching by returning exception generation conditions waiting to a state before the reception of the exception. In another preferred construction, after contexts of a plurality of threads in a thread set are read by the respective processors, arbitration is conducted by means of synchronization means to enable each processor to start thread execution simultaneously.

According to the second aspect of the invention, in a multi-processor system in which a plurality of threads to be simultaneously executed at a plurality of processors are stored as one thread set at a context area one-to-one corresponding to a thread set provided in a context save area on a main storage, a method of enabling a plurality of processors to start execution of threads simultaneously, comprising the steps:

(a) of conducting exclusive arbitration during exception processing of each processor so as to temporarily allow only one processor to obtain kernel scheduler execution authority, (b) of a processor obtaining kernel scheduler execution authority to save a context of a thread being executed by its own processor in the context save area on the main storage, as well as issuing a context save request as an inter-processor interruption to a processor executing other thread in the thread set to which the thread in question belongs, (c) of a processor issuing a context save request to, after confirming the completion of context saving at all of the requested processors, issue a context reading request regarding a thread to be executed by other processor in a thread set to be executed next to a processor which is to execute the thread in question, as well as reading a context of a thread to be executed by its own processor in the thread set to be executed next from the context save area on the main storage to return the context, (d) of a processor receiving the context reading request to read a context of the thread to return the context, and (e) upon completion of context return at all the processors executing threads in the thread set, of all the relevant processors to simultaneously start execution of threads.

In the preferred construction, the context save request is issued at Step (b) by designating a position in the context save area on the main storage. In another preferred construction, the method of enabling a plurality of processors to simultaneously start execution of threads in a multi-processor system further comprising the step of a processor receiving an inter-processor interruption related to the context save request to save a context of a thread being executed by its own processor in a designated position of the context save area on the main storage and notify a requesting-side processor of the completion.

In another preferred construction, a context reading request is made at Step (c) by designating a position of the context save area on the main storage which stores a context of a thread to be executed next.

In another preferred construction, a context is returned at Step (d) by reading a context of the thread from a designated position of the context save area on the main storage.

In another preferred construction, at Step (d), completion of context return is notified to all the processors executing threads in the thread set to which the thread in question belongs.

In another preferred construction, the method of enabling a plurality of processors to simultaneously start execution of threads in a multi-processor system further comprising the step, at the exclusive arbitration at Step (a), of a processor failing to obtain kernel scheduler execution authority to prepare and wait for reception of an inter-processor interruption from a processor obtaining kernel scheduler execution authority and when receiving an inter-processor interruption, set such that an exception reoccurs after thread switching by returning exception generation conditions waiting to a state before the reception of the exception.

According to the third aspect of the invention, a system which enables a plurality of processors to start execution of threads simultaneously, comprises means for storing, with a plurality of threads to be simultaneously executed as one thread set, a context of each thread in a thread set at a context area one-to-one corresponding to a thread set provided in a context save area on a main storage, and means for conducting exclusive arbitration during exception processing so as to temporarily allow only one processor among the plurality of processors constituting the multi-processor system to obtain kernel scheduler execution authority, wherein a processor obtaining kernel scheduler execution authority selects a thread set to be executed next and controls such that a plurality of threads in the selected thread set are simultaneously executed at a plurality of processors including its own processor.

According to the fourth aspect of the invention, in a multi-processor system in which a plurality of threads to be simultaneously executed at a plurality of processors are stored as one thread set at a context area one-to-one corresponding to a thread set provided in a context save area on a main storage, a device which enables a plurality of processors to start execution of threads simultaneously, comprises means for conducting exclusive arbitration during exception processing of each processor so as to temporarily allow only one processor to obtain kernel scheduler execution authority, means for a processor obtaining kernel scheduler execution authority to save a context of a thread being executed by its own processor in the context save area on the main storage, as well as issuing a context save request as an inter-processor interruption to a processor executing other thread in the thread set to which the thread in question belongs, means for a processor issuing a context save request to, after confirming the completion of context saving at all of the requested processors, issue a context reading request regarding a thread to be executed by other processor in a thread set to be executed next to a processor which is to execute the thread in question, means for reading a context of a thread to be executed by its own processor in a thread set to be executed next from the context save area on the main storage to return the context, means for a processor receiving the context reading request to read a context of a thread and return the context, and mean for, upon completion of context return at all the processors executing threads in the thread set, enabling all the relevant processors to simultaneously start execution of threads.

In the preferred construction, the context saving request issuing means issues the context save request by designating a position in the context save area on the main storage.

In another preferred construction, the device which enables a plurality of processors to simultaneously start execution of threads in a multi-processor system further comprises means for a processor receiving an inter-processor interruption related to the context save request to save a context of a thread being executed by its own processor in a designated position of the context save area on the main storage and notify the requesting-side processor of the completion.

In another preferred construction, the context reading requesting means makes a context reading request by designating a position of the context save area on the main storage which stores a context of a thread to be executed next.

In another preferred construction, the device which enables a plurality of processors to simultaneously start execution of threads in a multi-processor system further comprises means for notifying the completion of context return to all the processors executing threads in the thread set to which the thread in question belongs.

In another preferred construction, the device which enables a plurality of processors to start execution of threads simultaneously in a multi-processor system further comprises means for enabling, at the exclusive arbitration, a processor failing to obtain kernel scheduler execution authority to prepare and wait for reception of an inter-processor interruption from a processor obtaining kernel scheduler execution authority and when receiving an inter-processor interruption, return exception generation conditions waiting to a state before the reception of the exception to set such that an exception reoccurs after thread switching.

According to another aspect of the invention, in a multi-processor system in which a plurality of threads to be simultaneously executed at a plurality of processors are stored as one thread set at a context area one-to-one corresponding to a thread set provided in a context save area on a main storage, a computer readable memory for storing a program which enables a plurality of processors to start execution of threads simultaneously, the program comprising the steps:

(a) of conducting exclusive arbitration during exception processing of each processor so as to temporarily allow only one processor to obtain kernel scheduler execution authority, (b) of a processor obtaining kernel scheduler execution authority to save a context of a thread being executed by its own processor in the context save area on the main storage, as well as issuing a context save request as an inter-processor interruption to a processor executing other thread in the thread set to which the thread in question belongs, (c) of a processor issuing a context save request to, after confirming the completion of context saving at all of the requested processors, issue a context reading request regarding a thread to be executed by other processor in a thread set to be executed next to a processor which is to execute the thread in question, as well as reading a context of a thread to be executed by its own processor in the thread set to be executed next from the context save area on the main storage to return the context, (d) of a processor receiving the context reading request to read a context of the thread to return the context, and (e) upon completion of context return at all the processors executing threads in the thread set, of all the relevant processors to simultaneously start execution of threads.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 10 is a flow chart for use in explaining operation of conventional art.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
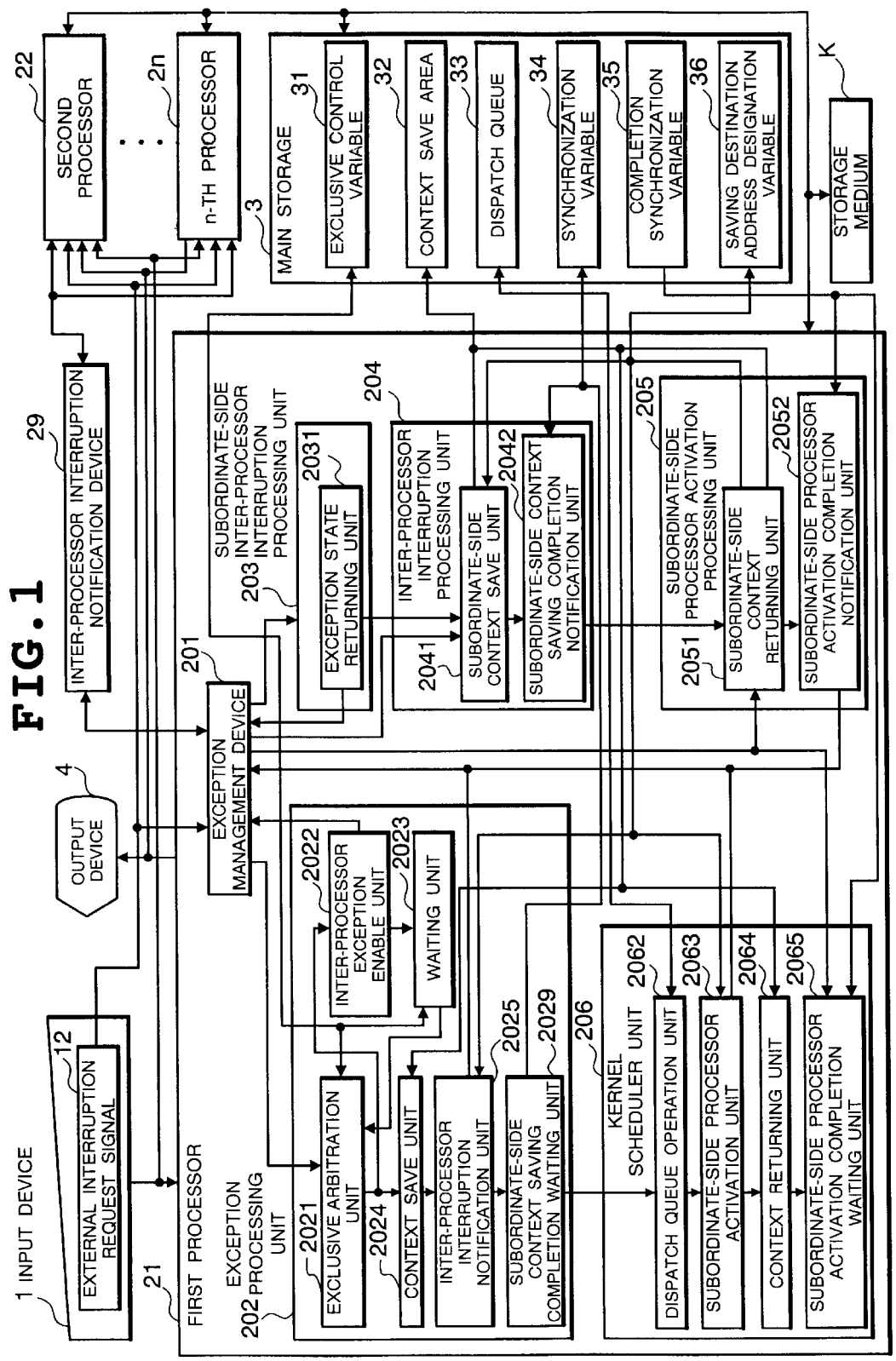
FIG. 1 is a block diagram showing one embodiment of a multi-processor system to which the present invention is applied.

FIG. 1 is a block diagram showing one example of a multi-processor system to which the present invention is applied and which includes first to n-th processors 21 to 2n, and a main storage 3, an input device 1, an output device 4 and an inter-processor interruption notification device 29 commonly used by the plurality of processors 21 to 2n.

The main storage 3 is accessible from all of the first to n-th processors 21 to 2n and provided with an exclusive control variable 31, a context save area 32, a dispatch queue 33, a synchronization variable 34, a completion synchronization variable 35 and a saving destination address designation variable 36.

The exclusive control variable 31 is a variable for use in conducting exclusive arbitration such that at the multi-processor system in question where a kernel scheduler is operable at each of the processors 21 to 2n, only one processor is temporarily allowed to obtain kernel scheduler execution authority. By the exclusive arbitration using the variable 31, a processor obtaining kernel scheduler execution authority attains a position of a superordinate-side processor and other processors attain a position of a subordinate-side processor to cooperate with each other for executing processing such as context switching. More specifically, a context saving destination, a storage position of a context to be returned, etc. are all notified to a subordinate-side processor by a superordinate-side processor to execute context switching led by the superordinate-side processor.

Subordinate-side processors include a processor which is executing a thread of a common user level and a processor which has failed to obtain execution authority by the exclusive arbitration using the variable 31 and is processing an exception, and the latter processor is referred to as a subordinate-side processor in the Specification.

The context save area 32 is an area for storing a context of a thread to be executed in the multi-processor system in question, in which a plurality of threads whose execution is to be started simultaneously at a plurality of processors are managed as one thread set and contexts of all the threads contained in the thread set are stored in a single context area.

Figure 2:
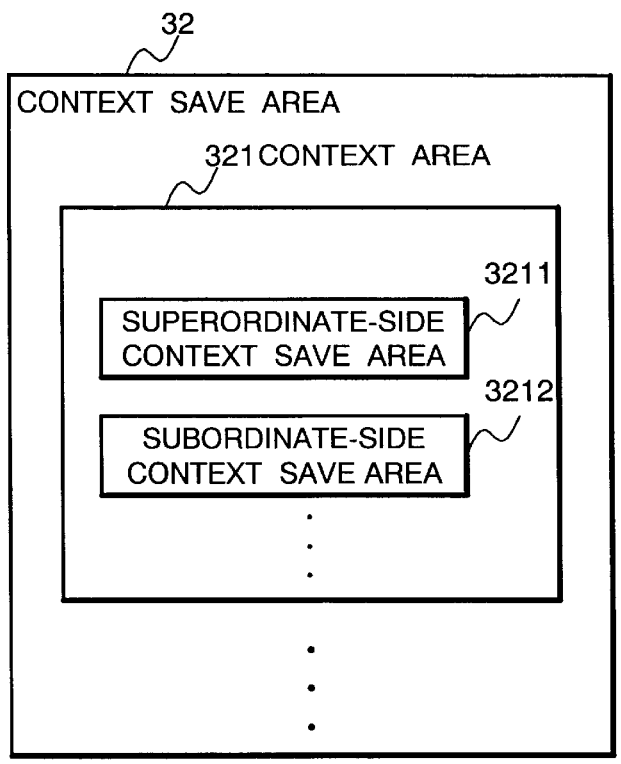
FIG. 2 is a diagram showing an example of a structure of a context save area.

FIG. 2 shows an example of a structure of the context save area 32. The context save area 32 includes at least one context area 321 one-to-one corresponding to a thread set, and one context area 321 includes one superordinate-side context save area 3211 and at least one subordinate-side context save area 3212. The superordinate-side context save area 3211 is an area in which an execution state of a superordinate-side processor is saved, while the subordinate-side context save area 3212 is an area in which an execution state of a subordinate-side processor is saved.

With a thread A1 and a thread A2 being executed at a superordinate-side processor and a subordinate-side processor, respectively, for example, when context switch is conducted, a context of the thread A1 is saved in the superordinate-side context save area 3211 and a context of the thread A2 is saved in the subordinate-side context save area 3212. Then, at the resumption of the thread set in question, the context of the thread A1 in the superordinate-side context save area 3211 is set at the superordinate-side processor and the context of the thread A2 in the subordinate-side context save area 3212 is set at the subordinate-side processor to resume execution of the threads A1 and A2 at the same time.

Figure 3:
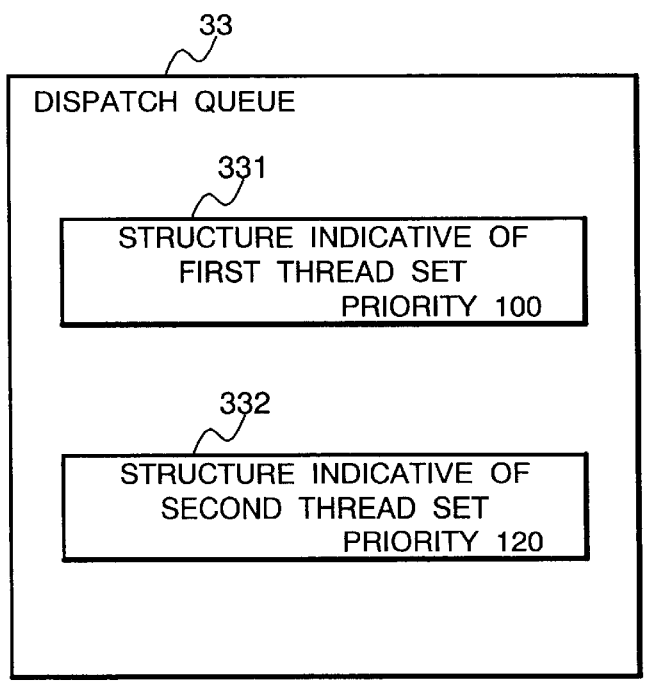
FIG. 3 is a diagram showing an example of contents of a dispatch queue.

The dispatch queue 33 is a queue at which a structure or an ID number indicative of a thread is registered for each thread set. FIG. 3 shows an example of contents of the dispatch queue 33. In this example, two are registered, a structure 331 indicative of the first thread set and a structure 332 indicative of the second thread set. Also registered is a priority of each thread set. More specifically, in the present embodiment, as to threads whose execution should be started simultaneously at a plurality of processors, a structure indicative of these threads is managed as one thread set and each thread set with a priority assigned is registered at the dispatch queue 33.

The synchronization variable 34 and the completion synchronization variable 35 are variables for use in providing synchronization in processing between a superordinate-side processor and a subordinate-side processor. Of them, the synchronization variable 34 is used for the notification of the completion of context saving to the superordinate-side processor by the subordinate-side processor and the completion synchronization variable 35 is used for the notification of the completion of context return to other processors including the superordinate-side processor by the subordinate-side processor. Each of the variables 34 and 35 has bits one-to-one corresponding to the respective processors 21 to 2n and has a predetermined value set as a value of a bit corresponding to its own processor to give a notification of completion of predetermined processing.

The saving destination address designation variable 36 is a variable used by a superordinate-side processor to notify a subordinate-side processor of an address of a place where a context of a thread is to be saved and an address of a place where a context to be returned is stored. Although the saving destination address designation variable 36 may have an arbitrary structure, the variable in the present embodiment has a bit string one-to-one corresponding to the processors 21 to 2n to allow a superordinate-side processor to set an address at a bit string corresponding to a subordinate-side processor which makes a request for context saving and return.

Internal structure of each of the processors 21 to 2n will be described next.

All of the first processor 21 through the n-th processor 2n have the same internal structure to be operable as a superordinate-side processor or a subordinate-side processor. In FIG. 1, components are illustrated only in a block of the first processor 21 and those in a block of the remaining processors 22 to 2n are omitted.

With reference to FIG. 1, each of the processors 21 to 2n includes an exception management device 201, an exception processing unit 202, a subordinate-side inter-processor interruption processing unit 203, an inter-processor interruption processing unit 204, a subordinate-side processor activation processing unit 205 and a kernel scheduler unit 206. Function of each component will be described in the following.

Exception management device 201

The exception management device 201 has, in addition to an exception management function of externally receiving an external interruption request signal from the input device 1 and an inter-processor interruption from other processor through the inter-processor interruption notification device 29 to activate a unit corresponding to an externally or internally generated or requested exception, a function of notifying an inter-processor interruption to an arbitrary processor through the inter-processor interruption notification device 29. An example of a structure of the exception management device 201 is shown in FIG. 4.

Figure 4:
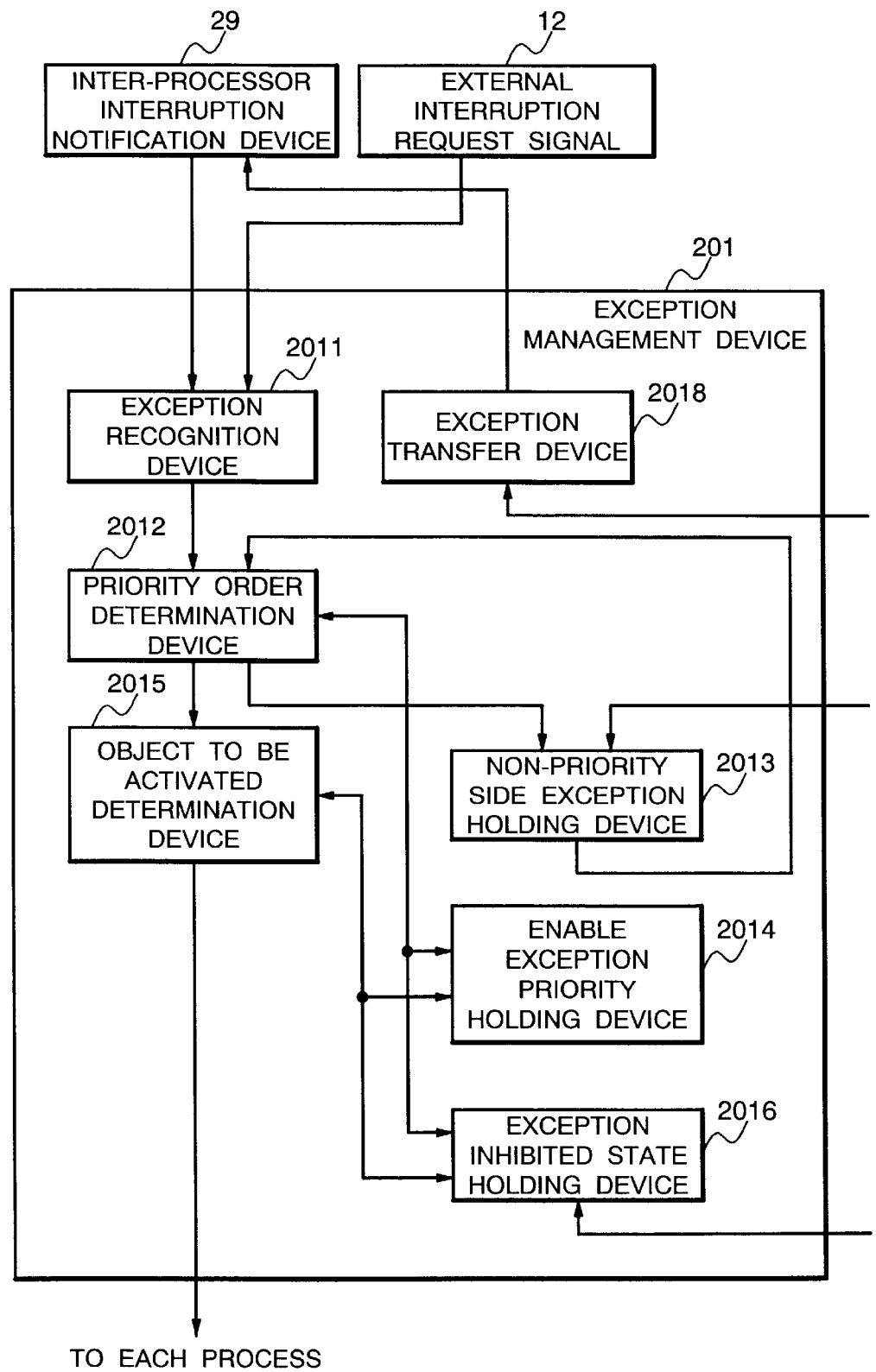
FIG. 4 is a block diagram showing an example of a structure of an exception management device.

With reference to FIG. 4, the exception management device 201 includes, as main components, an exception recognition device 2011, a priority order determination device 2012, a non-priority side exception holding device 2013, an enabled exception priority order holding device 2014, an object to be activated determination device 2015, an exception inhibited state holding device 2016 and an exception transfer device 2018.

The exception recognition device 2011 is a part for recognizing an exception related to an external interruption request signal 12 and an inter-processor interruption sent from other processor through the inter-processor interruption notification device 29 and an exception internally generated in a processor, which device sends a recognized exception to the priority order determination device 2012.

The enabled exception priority order holding device 2014 is a part for holding information about up to which order of priority an exception is currently allowed and the exception inhibited state holding device 2016 is a part for holding information as to whether its own processor is inhibiting an exception or not, and information held by these devices 2014 and 2016 are referred to by the priority order determination device 2012.

The non-priority side exception holding device 2013 is a part for holding an inhibited exception and an exception determined to be held because of its low priority.

The priority order determination device 2012 is a part for determining with respect to an exception recognized at the exception recognition device 2011 and an exception held by the non-priority side exception holding device 2013 whether the exception in question is to be executed at its own processor and if it is to be executed, detecting which exception is to be executed or to be held based on the information then stored at the enabled exception priority order holding device 2014 and the exception inhibited state holding device 2016. Exception determined to be held is preserved at the non-priority side exception holding device 2013. Exception determined to be executed is transferred to the object to be activated determination device 2015.

The object to be activated determination device 2015 is a part for selecting a unit suited to processing to be activated according to a kind of the exception transferred from the priority order determination device 2012 and activating the selected unit. At the time of determining a unit according to the processing to be activated and making the processor start execution, the object to be activated determination device 2015 also sets information at the enabled exception priority order holding device 2014 so as to hold an exception whose priority is lower than that of the exception whose processing is to be started and at the same time sets information at the exception inhibited state holding device 2016 so as to hold an inter-processor interruption.

The exception transfer device 2018 is a part for transferring an inter-processor interruption to other processor through the inter-processor interruption notification device 29 in response to a request from the exception processing unit 202 of its own processor etc.

In addition, each part of the exception management device 201 can be operated and set by each unit of a kernel level executed at its own processor, that is, the exception processing unit 202, the subordinate-side inter-processor interruption processing unit 203, the inter-processor interruption processing unit 204, the kernel scheduler unit 206, and the subordinate-side processor activation processing unit 205. Kinds of operation include the above-described operation of requesting the exception transfer device 2018 to transfer an inter-processor interruption to other processor through the inter-processor interruption notification device 29 and operation of releasing an exception state of the exception management device 201. Kinds of setting include setting the exception inhibited state holding device 2016 not to inhibit an inter-processor interruption and setting such that a predetermined exception (an exception returned by an exception state returning unit 2031 which will be described later) is registered at the non-priority side exception holding device 2013 to make the exception reoccur later.

(Exception Processing Unit 202)

The exception processing unit 202 is a unit for executing exception processing corresponding to the external interruption request signal 12 and an exception internally requested at a processor, which is activated by the object to be activated determination device 2015 of the exception management device 201. Internally provided are an exclusive arbitration unit 2021, an inter-processor exception enable unit 2022, a waiting unit 2023, a context save unit 2024, an inter-processor interruption notification unit 2025 and a subordinate-side context saving completion waiting unit 2029.

The exclusive arbitration unit 2021 is a unit for conducting exclusive processing among the processors by using the exclusive control variable 31 at the start of exception processing in question. When kernel scheduler execution authority is obtained by exclusive arbitration using the exclusive control variable 31, the processor in question attains the position of a superordinate-side processor to execute the context save unit 2024, the inter-processor interruption notification unit 2025 and the subordinate-side context saving completion waiting unit 2029 and proceed to the kernel scheduler unit 206. On the other hand, when the exclusive arbitration unit 2021 fails to obtain kernel scheduler execution authority, the processor in question attains the position of a subordinate-side processor to proceed to the inter-processor exception enable unit 2022 and the waiting unit 2023 in preparation for operation as a subordinate-side processor.

The context save unit 2024 is a unit for saving an execution state (context) of its own processor (superordinate-side processor) in the context save area 32. Since the processor in question is a superordinate-side processor, a saving destination is the superordinate-side context save area 3211 at the context area 321 corresponding to a currently executed thread set in the context save area 32 shown in FIG. 2.

The inter-processor interruption notification unit 2025 is a unit for setting, at the saving destination address designation variable 36, a saving destination address at which a context of a subordinate-side processor is to be saved, and then operating the exception transfer device 2018 of the exception management device 201 to notify the subordinate-side processor of an inter-processor interruption which requests the saving of the context through the inter-processor interruption notification device 29.

Saving destination address to be designated is the subordinate-side context save area 3212 in the context area 321 corresponding to the currently executed thread set in the context save area 32 illustrated in FIG. 2. Processor to be notified of an inter-processor interruption is a processor which is executing a thread set in parallel together with its own processor. When a plurality of processors to be notified exist, that is, when the thread set includes three or more threads, the unit 2025 notifies a saving destination address individually to the processors.

The subordinate-side context saving completion waiting unit 2029 is a unit for waiting for all the subordinate-side processors requested for context saving by the inter-processor interruption notification unit 2025 to finish context saving and thereafter activating the kernel scheduler unit 206.

As will be described later, since when a subordinate-side processor completes context saving, it operates a bit of the synchronization variable 34 corresponding to its own processor, the subordinate-side context saving completion waiting unit 2029 is enabled to determine whether all of the subordinate-side processors complete context saving or not by monitoring the change of the relevant bit of the synchronization variable 34. The subordinate-side context saving completion waiting unit 2029 initializes the synchronization variable 34 at the time of confirming that all of the subordinate-side processors complete context saving.

On the other hand, the inter-processor exception enable unit 2022, which is executed when the processor attains the position of a subordinate-side processor, is a unit for, by changing the setting of the exception inhibited state holding device 2016 of the exception management device 201, allowing an inter-processor interruption inhibited by the exception management device 201 when the exception processing unit 202 is started to receive, as a subordinate-side processor, an inter-processor interruption related to a context save request from a superordinate-side processor. After the processing is completed, execution proceeds to the next waiting unit 2023.

The waiting unit 2023 is a unit for waiting for the exclusive control variable 31 to be returned to an original value by a superordinate-side processor which has obtained exclusive conditions and when the superordinate-side processor finishes exclusive processing without issuing an inter-processor interruption related to a context save request to its own processor, completing its own unit 2023 to return the processing to the exclusive arbitration unit 2021. The superordinate-side processor refrains from issuing an inter-processor interruption related to a context save request to its own processor in such a case where its own processor is not executing a thread in a thread set whose context is to be switched by the superordinate-side processor.

When at the execution of the waiting unit 2023, an inter-processor interruption related to a context save request is issued to its own processor, the exception management device 201 activates the subordinate-side inter-processor interruption processing unit 203 as will be described later.

(Kernel Scheduler Unit 206)

The kernel scheduler unit 206 is a unit for selecting a thread set to be activated and reading the same as a context, which includes a dispatch queue operation unit 2062, a subordinate-side processor activation unit 2063, a context returning unit 2064 and a subordinate-side processor activation completion waiting unit 2065.

The dispatch queue operation unit 2062 is a unit for registering an executable thread set at the dispatch queue 33 and obtaining a thread set to be activated next from the dispatch queue 33 according to priority order.

The subordinate-side processor activation unit 2063 is a unit for setting at the saving destination address designation variable 36, with respect to a thread to be executed at a subordinate-side processor among threads contained in the thread set which is determined to be activated next at the dispatch queue operation unit 2062, an address of a place in the context save area 32 where a context of the thread is stored, and then operating the exception transfer device 2018 of the exception management device 201 to notify the subordinate-side processor of an inter-processor interruption which requests context reading through the inter-processor interruption notification device 29.

Address to be designated is the subordinate-side context save area 3212 assuming the context area 321 in the context save area 32 shown in FIG. 2 corresponds to the thread set to be activated next. Processor to be notified inter-processor interruption is a processor which is to execute the thread set in parallel together with its own processor. When a plurality of processors to be notified exist, that is, when a thread set includes three or more threads, the processors are individually notified of a context reading destination address.

The context returning unit 2064 is a unit for making preparations for thread activation by reading, from the context save area 32, a context related to a thread to be executed by its own processor in the thread set to be activated next which is selected by the dispatch queue operation unit 2062. More specifically, assuming that the context area 321 in the context save area 32 corresponds to the thread set to be activated next, the unit 2064 reads the context from the superordinate-side context save area 3211.

The subordinate-side processor activation completion waiting unit 2065 is a unit for waiting for all the subordinate-side processors requested for context reading by the subordinate-side processor activation unit 2063 to complete their processing and thereafter completing the kernel scheduler unit 206 to start thread execution. As will be described later, since the subordinate-side processor operates a bit of the completion synchronization variable 35 corresponding to its own processor when finishing context reading, the subordinate-side context activation completion waiting unit 2065 is enabled to determine whether all the subordinate-side processors complete context reading or not by monitoring a change of the bit in question of the completion synchronization variable 35.

In preparation for processing of a subordinate-side processor activation completion notification unit which will be described later, the subordinate-side processor activation completion waiting unit 2065 sets a bit of the completion synchronization variable 35 corresponding to its own processor at a value indicative of completion of context return. The completion synchronization variable 35 is initialized by the subordinate-side processor activation completion waiting unit 2065 at a time when a plurality of processors simultaneously start execution of threads in a thread set.

(Subordinate-Side Inter-Processor Interruption Processing Unit 203)

The subordinate-side inter-processor interruption processing unit 203 is a unit which is called by the exception management device 201 when at the execution of the waiting unit 2023 by a subordinate-side processor, an inter-processor interruption related to a context saving request arrives through the inter-processor interruption notification device 29 and which has an exception state returning unit 2031.

The exception state returning unit 2031 is a unit for once returning a state of an execution which is a cause of the processing executed at the exception processing unit 202 at inferior waiting to a state before its reception by the exception management device 201, that is, to a state prior to occurrence of the exception. The exception state returning unit 2031 operates states of such a component of a processor which is executing exception processing as a register and a state of the exception management device 201 to return them to a state prior to the occurrence of the exception. Subsequently to the exception state returning unit 2031, the inter-processor interruption processing unit 204 is executed.

(Inter-Processor Interruption Processing Unit 204)

The inter-processor interruption processing unit 204 is called by the exception management device 201 when an inter-processor interruption related to a context saving request arrives from a superordinate-side processor through the inter-processor interruption notification device 29 while user-level processing other than kernel processing is conducted such as processing of the exception processing unit 202.

When an inter-processor interruption related to a context saving request arrives through the inter-processor interruption notification device 29 while exception processing of kernel level, not user-level processing, is conducted, the unit 204 is activated after the processing by the subordinate-side inter-processor interruption processing unit 203 is completed as is described above.

The inter-processor interruption processing unit 204 is a unit for saving a context of its own processor in response to a request from a superordinate-side processor and notifying the superordinate-side processor of the completion, which unit has a subordinate-side context save unit 2041 and a subordinate-side context saving completion notification unit 2042.

The subordinate-side context save unit 2041 is a unit for saving an execution state (context) of its own processor in the context save area 32. The subordinate-side context save unit 2041 refers to the saving destination address designation variable 36 to obtain an area in the context save area 32 in which its own processor is to save the context.

The subordinate-side context saving completion notification unit 2042 is a unit for notifying a superordinate-side processor of the completion of context saving by means of the synchronization variable 34.

(Subordinate-Side Processor Activation Processing Unit 205)

The subordinate-side processor activation processing unit 205 is activated by the exception management device 201 upon receiving an inter-processor interruption related to a context reading request from a superordinate-side processor through the exception management device 201 and the inter-processor interruption notification device 29 after the subordinate-side context saving completion notification unit 2042 notifies the superordinate-side processor of the completion of context saving by using the synchronization variable 34.

The subordinate-side processor activation processing unit 205 is a unit for reading a context of its own processor and notifying the completion to all the processors which simultaneously execute a thread set including a superordinate-side processor, and upon detecting completion of context reading of all the treads in the thread set at each processor, starting execution of the thread with said read context, which unit has a subordinate-side context returning unit 2051 and a subordinate-side processor activation completion notification unit 2052.

The subordinate-side context returning unit 2051 obtains a reading destination address of a context to be returned from a bit string of the saving destination address designation variable 36 corresponding to its own processor and reads the context from the relevant place in the context save area 32 to return the execution state of its own processor.

The subordinate-side processor activation completion notification unit 2052, upon completion of the processing of the subordinate-side context returning unit 2051, sets a bit of the completion synchronization variable 35 corresponding to its own processor at a value indicative of return completion, thereby notifying all the processors which are simultaneously executing a thread set of the completion of context return of its own processor.

Then, the subordinate-side processor activation completion notification unit 2052, upon confirming that the completion synchronization variable 35 is monitored, controls the execution management device 201 to release the exception state and starts execution of the thread with the read context.

In FIG. 1, K represents a machine-readable recording medium such as a disk and a semiconductor memory in which a control program is recorded. The control program recorded in the recording medium K is read by the first processor 21 to the n-th processor 2n to realize on each processor, the exception processing unit 202, the subordinate-side inter-processor interruption processing unit 203, the inter-processor interruption processing unit 204, the kernel scheduler unit 206 and the subordinate-side processor activation processing unit 205, as well as initially generating, on the main storage 3, the exclusive control variable 31, the context save area 32, the dispatch queue 33, the synchronization variable 34, the completion synchronization variable 35 and the saving destination address designation variable 36.

Figure 5:
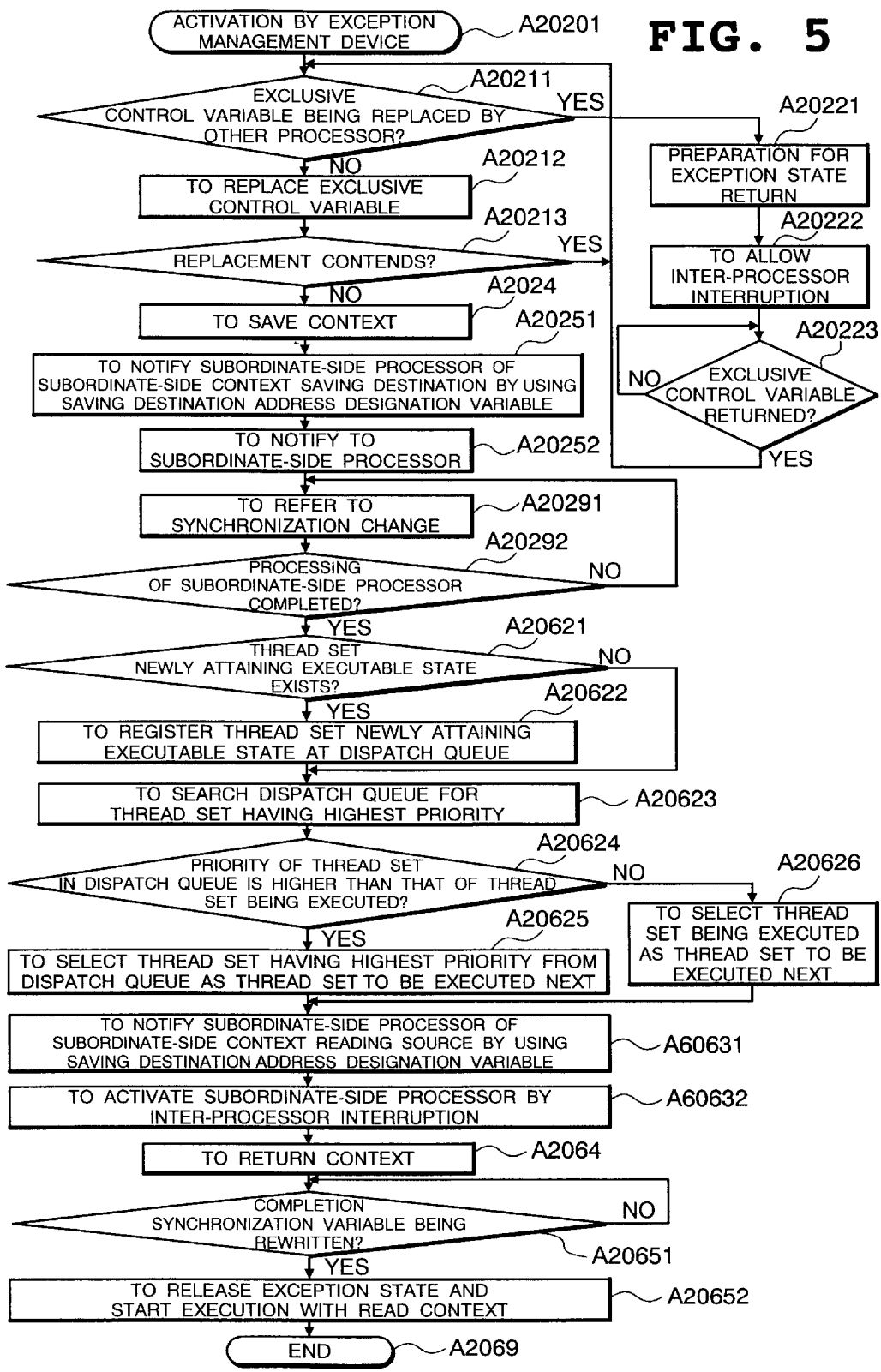
FIG. 5 is a flow chart showing an example of operation of an embodiment of the present invention.
Figure 6:
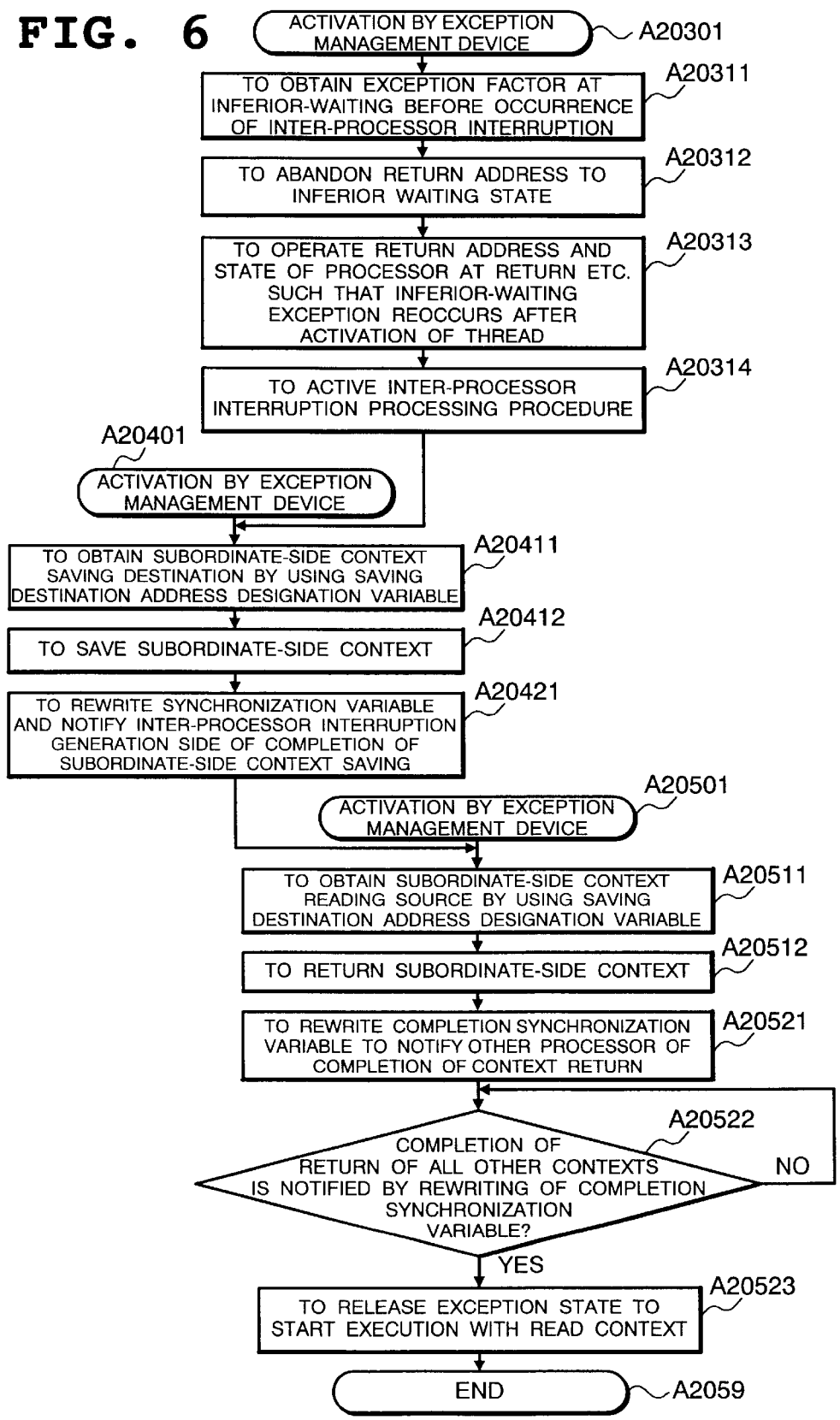
FIG. 6 is a flow chart showing an example of operation of the embodiment of the present invention.

FIGS. 5 and 6 are flow charts showing an example of operation of the present embodiment and in the following, operation of the present embodiment will be described in detail with reference the respective figures.

It is assumed here for the sake of explanation that all the thread sets generated and executed on the multi-processor system in question include two threads. Each of the two threads contained in one thread set in general correspond to an individual routine of a certain program. Even a case where one thread is essentially enough, a thread set including two threads is generated in the present embodiment. The method therefor is, for example, making only one thread correspond to a specific routine and the other thread be a dummy thread which executes none of substantial processing.

As to the first to n-th processors 21 to 2n, two each are grouped and each group executes a thread set simultaneously. In which group a processor is to be contained is, for example, set using a parameter at the activation of the multi-processor system and is notified to each processor. It is also possible that all the processors are temporarily stopped during operation and again grouped. In the following, description will be made assuming that the first processor 21 and the second processor 22 belong to the same group.

Assuming here that a processor requested by the external interruption request signal 12 applied through the input device 1 is, for example, the first processor 21, the external interruption request signal 12 is received by the exception management device 201 of the first processor 21 and recognized by the exception recognition device 2011. Thereafter, the priority order determination device 2012 compares a priority of the external interruption request signal 12 and a priority held by the enabled exception priority order holding device 2014 and further checks whether an exception is not inhibited by the exception inhibited state holding device 2016, and then depending on a case, after holding the result at the non-priority exception holding device 2013, notifies the object to be activated determination device 2015 of the result.

The object to be activated determination device 2015 calls the exception processing unit 202 registered in advance because a cause of a request for an exception is the external interruption request signal (Step A20201 in FIG. 5). The object to be activated determination device 2015 by that time has conducted such processing as change of the setting of the exception inhibited state holding device 2016 to inhibit inter-processor interruption.

The exception processing unit 202 checks by means of the exclusive arbitration unit 2021 whether the exclusive control variable 31 is rewritten by other processor (Step A20211) and when it is not replaced, replaces the exclusive control variable 31 to further check whether the replacement processing contends with that of other processor (Step A20213).

When replacement of the exclusive control variable 31 succeeds by the processing so far, the first processor 21 proceeds to the processing at Step A2024 and the following steps in order to operate as a superordinate-side processor and when the replacement fails, because any other processor starts operation as a superordinate-side processor, the processor 21 defers attaining the position of the superordinate-side processor to proceed to the processing at Step A20221 and the following steps. Since the replacement succeeds here, the first processor 21 is assumed to attain the position of the superordinate-side processor.

The first processor 21 next executes the context save unit 2024 to save an execution state of its processor, that is, a context, in the context save area 32 (Step A2024). That is, when the first processor 21 is executing a thread in a thread set corresponding to the context area 321 of FIG. 2, the unit 2024 saves the context of the thread in question in the superordinate-side context save area 3211.

Furthermore, by setting the saving destination address designation variable 36 by means of the inter-processor interruption notification unit 2025, the first processor 21 designates an area where the second processor 22 which simultaneously conducts thread switching is to save the context (Step A20251) and makes a request to the inter-processor interruption notification device 29 through the exception management device 201 to notify the second processor 22 of an inter-processor interruption related to a context saving request (Step A20252).

Next, in order to wait for the second processor 22 to complete context saving processing, the first processor 21 refers to the synchronization variable 34 (Step A20291) to check whether the bit in question of the synchronization variable 34 indicates the completion of context saving processing (Step A20292) and upon confirming the completion, advances the processing to the kernel scheduler unit 206.

At the kernel scheduler unit 206, first the dispatch queue operation unit 2062 is executed to determine whether a thread set newly attaining an executable state is generated at the exception processing unit 202 (Step A20621) and when such a thread set is generated, the thread set is registered at the dispatch queue 33 (Step A20622). Subsequently, search the dispatch queue 33 for a thread set whose priority is the highest (Step A20623) and compare the priority with a priority of a thread set having been executed before generation of an exception (Step A20624).

When the priority of the executable thread set registered at the dispatch queue 33 is higher, select the thread set registered at the dispatch queue 33 as a thread set to be executed next (Step A20625) and otherwise select the thread set being executed as a thread set to be executed next (Step A20626).

When the thread set to be executed next is determined, set, to the saving destination address designation variable 36, a position in the context save area 32 from which an execution state, that is, a context of a thread in the thread set to be executed by the subordinate-side processor is read (Step A20631) and notify the second processor 22 of an inter-processor interruption related to a context reading request by means of the inter-processor interruption notification device 29 through the exception management device 201 (Step A20632).

The first processor 21 thereafter reads a context of its own processor from the context save area 32 (Step A2064) and then monitors completion of context reading at the second processor 22 by using the completion synchronization variable 36 (Step A20651).

Upon confirming the context reading completion at the second processor 22, the first processor 21 operates the exception management device 201 to release the exception state and start execution with the read context, thereby completing activation of the kernel scheduler and execution of the kernel scheduler unit 206 (Steps A20652 and S2069).

Next, operation of a subordinate-side processor will be described with respect to the second processor 22.

At a time when the exception management device 201 of the second processor 22 receives an inter-processor interruption related to a context saving request which is issued by the first processor 21 from the inter-processor interruption notification device 29, the second processor 22 is executing a thread of a common user level or operating as a subordinate-side processor which fails to obtain exclusive conditions by the exclusive arbitration unit 2021. The reason is that the first processor 21 issuing the inter-processor interruption is allowed to issue the inter-processor interruption just because exclusive conditions are obtained by the exclusive arbitration unit 2021 and all the other processors including the second processor 22 than the first processor 21, when executing the exception processing unit 202, are positioned inferiorly at the level of the exclusive arbitration unit 2021 without fail.

When the second processor 22 is executing a thread of a user level, the exception recognition device 2011 and the priority order determination device 2012 of the exception management device 201 notify the object to be activated determination device 2015 so as to process an exception related to the inter-processor interruption related to the received context saving request, whereby the object to be activated determination device 2015 selects the inter-processor interruption processing unit 204 as an inter-processor interruption processing unit.

As a result, the second processor 22 starts execution of the inter-processor interruption processing unit 204 (Step A20401 of FIG. 6). Operation after the execution of the inter-processor interruption processing unit 204 is started will be described later.

On the other hand, in a case where the second processor 22 is a subordinate-side processor failing to obtain exclusive conditions by the exclusive arbitration unit 2021, when the second processor 22 receives an inter-processor interruption related to a context saving request from the first processor 21 before completing the processing of the inter-processor exception enable unit 2022, the inter-processor interruption in question is held at the exception management device 201. This is because of setting such that at the time when the second processor 22 activates the exception processing unit 202 due to some exception factor or other, the object to be activated determination device 2015 of the exception management device 201 holds the inter-processor interruption.

The hold, however, is released when the second processor 22 completes the processing of the inter-processor exception enable unit 2022, so that the held inter-processor interruption is processed. The reason is that in the second processor 22, in preparation for operation as a subordinate-side processor in response to an inter-processor interruption, the inter-processor exception enable unit 2022 allows an inter-processor interruption by setting a resistor value within the processor etc. so as to once return an exception being processed to a state prior to its generation before the reception by the exception management device 201 (Step A20221) and then setting the exception inhibited state holding device 2016 (Step A20222).

When an inter-processor interruption related to a context saving request from the first processor 21 is received after a time point where the second processor 22 completes the processing of the inter-processor exception enable unit 2022, that is, when the second processor 22 is executing the waiting unit 2023, the inter-processor interruption will be immediately processed without holding because inhibition of the inter-processor interruption is already released.

As described in the foregoing, while the second processor 22 is operating as a subordinate-side processor, if processing of an exception related to an inter-processor interruption for a context saving request from the first processor 21 is started, the object to be activated determination device 2015 of the exception management device 201 activates the subordinate-side inter-processor interruption processing unit 203 (Step A20301 of FIG. 6).

The subordinate-side inter-processor interruption processing unit 203, after obtaining an exception factor at inferior-waiting by means of the exception state returning unit 2031 (Step A20311), abandons a register value etc. of the processor indicating that an exception is once received to execute the exception processing unit 202 (Step A20312) and operates the exception management device 201 and a register value of the second processor etc. such that a waiting exception will be again generated at the resumption of thread execution (Step A20313) to shift the execution to the inter-processor interruption processing unit 204 (Step A20314).

In the inter-processor interruption processing unit 204, the subordinate-side context save unit 2041 refers to the saving destination address designation variable 36 to obtain a saving destination of the context of its own processor (Step A20411) and saves the execution state of its own processor, that is, the context, as a subordinate-side context (Step A20412).

When saving is completed, rewrite a value of a bit of the synchronization variable 34 corresponding to its own processor by the subordinate-side context saving completion notification unit 2042 and notify the first processor 21 as a notification source of inter-processor interruption of the completion of context saving (Step A20421).

Thereafter, when an inter-processor interruption related to a context return request is received at the exception management device 201 of the second processor 22 from the first processor 21 through the inter-processor interruption notification device 29, the subordinate-side processor activation processing unit 205 is activated by the object to be activated determination device 2015.

At the subordinate-side processor activation processing unit 205, obtain a reading source of a context to be returned from the saving destination address designation variable 36 by the subordinate-side context returning unit 2051 (Step A20511) to return an execution state of its own processor, that is, a subordinate-side context (Step A20512). Thereafter, rewrite a value of a bit of the completion synchronization variable 35 corresponding to its own processor by the subordinate-side processor activation completion notification unit 2052 to notify the first processor 21 of the completion of the context return (Step A20521).

Furthermore, the second processor monitors the completion synchronization variable 35 and upon confirming that context return of all the processors simultaneously executing a thread set (in this case, only the first processor 21 other than its own processor) is completed (Step A20522), controls the exception management device 201 to release the exception state and starts execution with the read context to complete activation of the kernel scheduler and execution of the subordinate-side processor activation processing unit 205 (Steps A20523 and A2059).

In a manner as described above, context switching of the thread set being executed by the first processor 21 and the second processor 22 is synchronously executed led by the first processor 21 and each thread of the thread set returning to the first processor 21 and the second processor 22 starts execution simultaneously.

The third to n-th processors which receive none of inter-processor interruptions from the first processor 21 as the superordinate-side processor, when executing a thread of a user level, are allowed to continue execution of the thread without any problem, and when trying to be a superordinate-side processor for conducting context switching of another thread set to become a subordinate-side processor, detect, at the waiting unit 2023, the exclusive control variable 31 being rewritten by the first processor 21 without receiving an inter-processor interruption directed to its own processor to return to the exclusive arbitration unit 2021.

As described in the foregoing, even in a case where a plurality of processors conduct exception processing, the present embodiment enables selection of one processor to execute the kernel scheduler unit 206 by the exclusive arbitration unit 2021 and enables a processor which has failed to obtain kernel scheduler execution authority to prepare and wait for reception of an inter-processor interruption from a processor which has obtained kernel scheduler execution authority, so that even when a plurality of processors are executing different exception processing simultaneously, each processor is allowed to conduct thread switching processing completely at the same time.

In addition, since a subordinate-side processor, upon receiving an inter-processor interruption, returns waiting exception occurrence conditions to a state prior to the reception of an exception to set such that an exception reoccurs after thread switching, the processor is allowed to conduct exception processing after thread switching. Thus, synchronization is already established at a time point of thread switching, which results in realizing a kernel scheduler ensuring that a plurality of threads will be activated simultaneously with a small overhead.

Next, operation of the present embodiment will be described with respect to a specific example.

Figure 7:
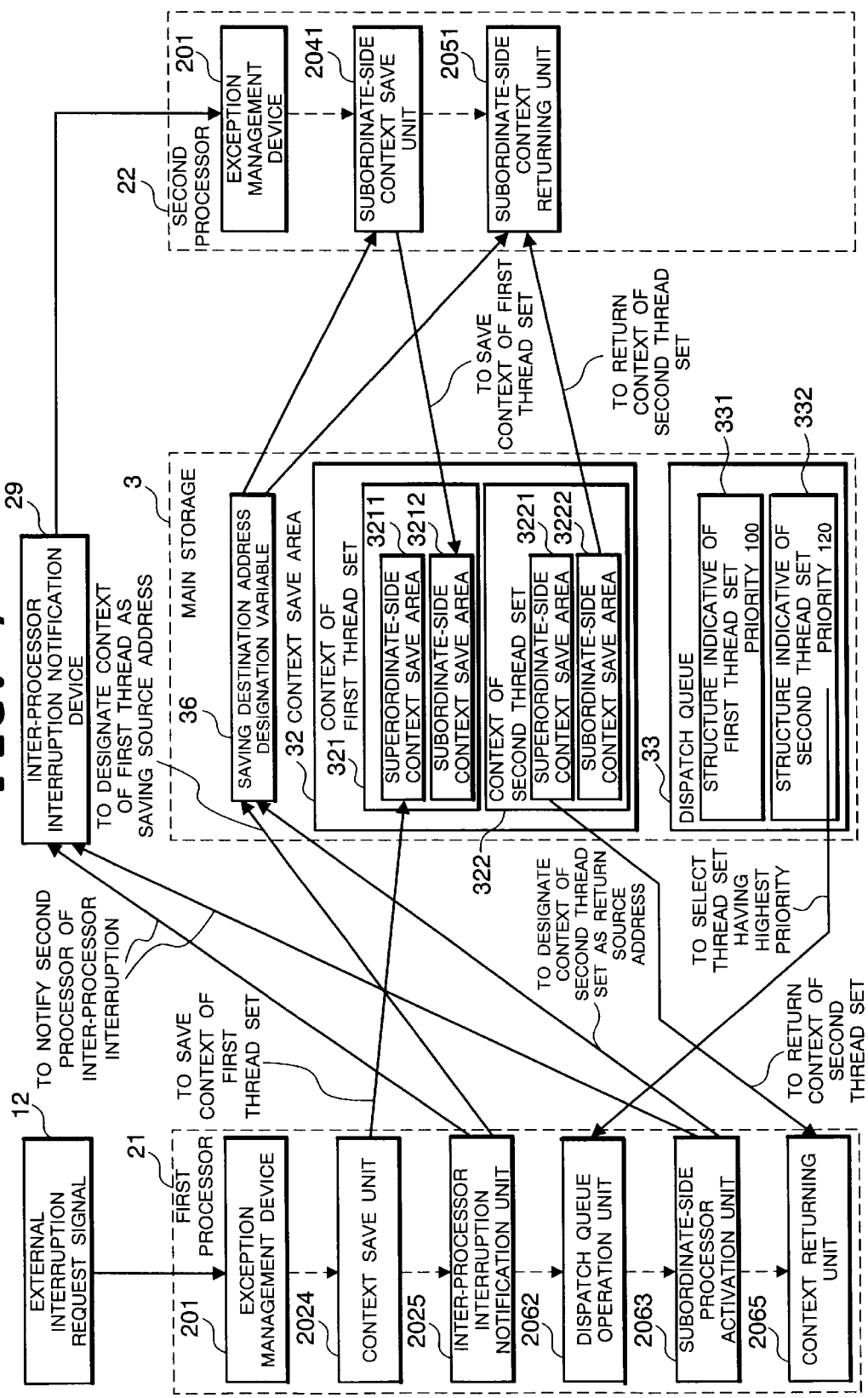
FIG. 7 is a diagram showing an example of specific operation of the embodiment of the present invention.

As illustrated in FIG. 7, assume that the first processor 21 and the second processor 22 exist and when the first processor 21 and the second processor 22 execute the first thread set, the external interruption request signal 12 is received by the first processor 21 and the exception processing unit 202 is activated by the exception management device 201 to make the first processor 21 be a superordinate-side processor.

The context save unit 2024 of the first processor 21 saves an execution state of its own processor at the superordinate-side context save area 3211 located at the context 321 of the first thread set in the context save area 32. The inter-processor interruption notification unit 2025 of the first processor 21 writes, in the saving designation address designation variable 36, a value designating the subordinate-side context save area 3212 at the context 321 of the first thread set and issues an inter-processor interruption related to a context save request to the second processor 22.

At the exception management device 201 of the second processor 22, the subordinate-side context save unit 2041 saves the context in the sub-ordinate context save area 3212 at the context 321 of the first thread set obtained with reference to the saving destination address designation variable 36.

The dispatch queue operation unit 2062 of the first processor 21 refers to priority of each thread set stored in the dispatch queue 33 and selects, in the example of FIG. 7, the second thread set as a thread set to be executed next.

The first processor 21 which has selected the second thread set as the subsequent thread set sets the saving destination address designation variable 36 by means of the subordinate-side processor activation unit 2063 and instructs the subordinate-side processor on a subordinate-side context save area 3222 in a context 322 of the second thread set to issue an inter-processor interruption related to a context read request to the second processor 22.

The second processor 22 refers to the saving destination address designation variable 36 by means of the subordinate-side context returning unit 2051 to conduct context returning processing, with the subordinate-side context save area 3222 located in the context 322 of the second thread set as a context reading source.

Thereafter, the first processor 21 confirms the completion of the context reading by the second processor 22 and the second processor 22 confirms the completion of context reading by the first processor 21 and both start execution of the second thread set simultaneously.

Figure 8:
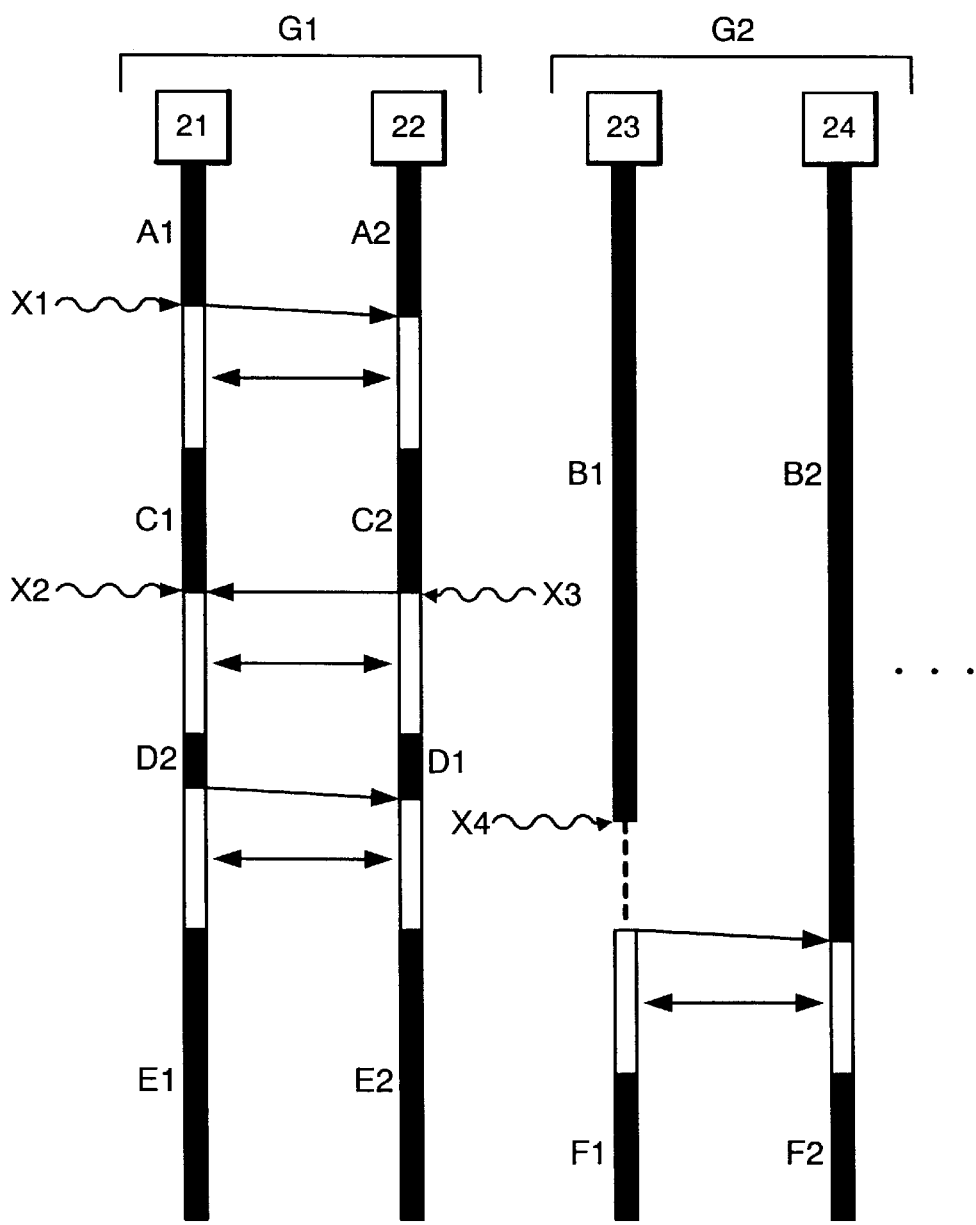
FIG. 8 is a timing chart showing how thread sets are simultaneously executed on a processor group basis in the present embodiment of the present invention.
Figure 9:
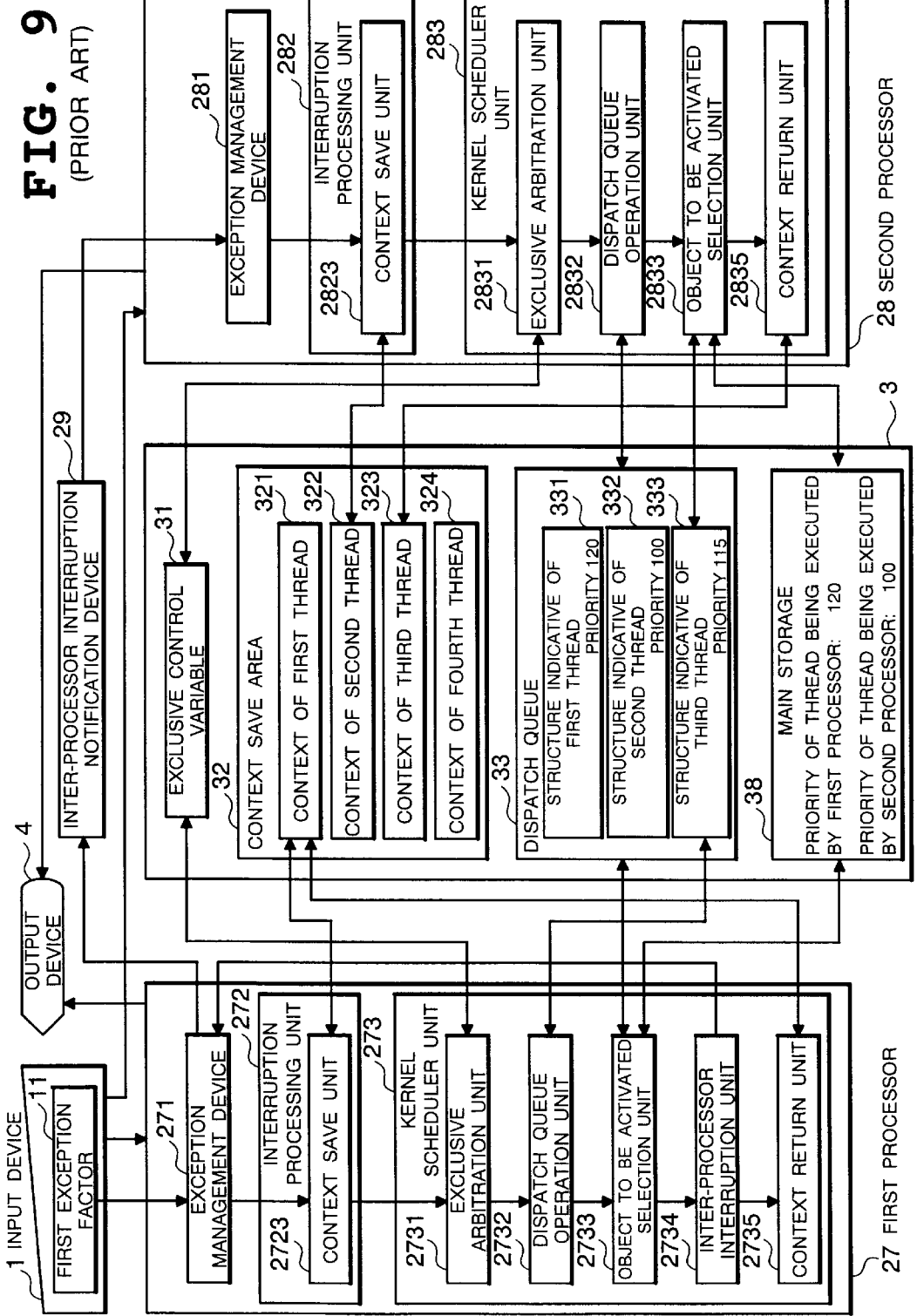
FIG. 9 is a block diagram showing one example of a structure of conventional art.

FIG. 8 is a timing chart showing how thread sets are executed simultaneously on a group basis. With threads A1 and A2 in a thread set A being executed by the first and the second processors 21 and 22 belonging to a group G1, respectively, and threads B1 and B2 in a thread set B being executed by third and fourth processors 23 and 24 belonging to a group G2, respectively, when an external interruption request signal X1 is applied to the first processor 21, the first processor 21 attains a position of a superordinate-side processor and conducts context switch in cooperation with the second processor 22 and the first and the second processors 21 and 22 simultaneously start execution of threads C1 and C2 in a thread set C.

Also shown in FIG. 8 is a state where an external interruption request signal X2 and an external interruption request signal X3 are thereafter applied approximately at the same time to the first processor 21 and the second processor 22, respectively. In this case, one that obtains kernel scheduler authority earlier by exclusive arbitration using the exclusive control variable 31 first attains a position of a superordinate-side processor to lead context switch. In FIG. 8, since the second processor 22 first attains the position of a superordinate-side processor, context switch is conducted led by the second processor 22 and execution of threads D1 and D2 in a new thread set D is simultaneously started at the first and the second processors 21 and 22.

Then, at the first processor 21, an exception related to the external interruption request signal X2 is again generated after thread switching and this time the first processor 21 attains the position of a superordinate-side processor to control context switch, whereby according to a priority relationship between the thread set D and a newly generated thread set E, execution of threads E1 and E2 in the thread set E in place of the thread set D is started simultaneously at the first and the second processors 21 and 22.

Moreover, since at the timing of execution of the exception processing unit 202 in response to an external interruption request signal X4 generated at its own processor to attain a position of a superordinate-side processor, the first processor 21 has already attained the position of a superordinate-side processor, the third processor 23 enters an inferior wait state, and upon release of the exclusion by the exclusive control variable 31 without issuance of an inter-processor interruption to its own processor 23, attains the position of a superordinate-side processor and switches a context from the thread set B to the thread set F in cooperation with the fourth processor 24.

Although the embodiment of the present invention has been described in the foregoing, the present invention is not limited to the above embodiment but allowed to have various addition and modification. In the following, several modified examples will be listed.

Although in the present embodiment, priority is assigned to the dispatch queue 33 on a thread set basis, the priority may not be explicit but held implicitly according to location on the queue etc.

In the present embodiment, at the exception processing unit 202, processing proceeds to the context save unit 2024 after the completion of the processing at the exclusive arbitration unit 2021. Further added to the present embodiment may be the processing, after the completion of the exclusive arbitration unit 2021 (Step A20213), of checking an exception factor etc. held by the exception management device 201, immediately finishing processing according to the exception factor etc. depending on the contents of the exception, initializing the exclusive control variable 31, directly proceeding to Step A20652 and releasing the exception state to resume the execution at the original execution state (context).

In this case, there will newly occur at the waiting unit 2023 as a state where the superordinate-side processor fails to issue an inter-processor interruption related to a context save request to its own processor, a case where the superordinate-side processor immediately finishes the exception processing unit 202 without starting the kernel scheduler unit 206, which will not affect a procedure of returning from the waiting unit 2023 and the like.

Although in the present embodiment, by the issuance of an inter-processor interruption related to a context read request from the subordinate-side processor activation unit 2063 of the superordinate-side processor to the subordinate-side processor, the subordinate-side processor activation processing unit 205 is activated at the subordinate-side processor, the unit 205 may be activated using the synchronization variable 34.

More specifically, the subordinate-side context saving completion notification unit 2042 at the subordinate-side processor changes a bit of the synchronization variable 34 corresponding to its own processor to a value indicative of the context saving completion and then continues to monitor the value of the bit and regards a change in the value as the issuance of a context read request to activate the subordinate-side processor activation processing unit 205. Accordingly, the superordinate-side processor makes a context read request by changing a value of the bit of the synchronization variable 34 corresponding to a processor which is requested of a return of a context by means of the superordinate-side processor activation unit 2063.

Although in the present embodiment, completion of the saving of a context is notified from a subordinate-side processor to a superordinate-side processor using the synchronization variable 34, the notification of the completion of context saving may be made by issuing an inter-processor interruption to the superordinate-side processor from the subordinate-side context saving completion notification unit 2042 of the subordinate-side processor through the exception management device 201 and the inter-processor interruption notification device 29.

Although in the present embodiment, completion of context reading is notified to other processors by means of the subordinate-side processor activation completion notification unit 2052 using the completion synchronization variable 35, synchronization processing may be conducted by using the inter-processor interruption notification device 29. In this case, all the processors which activate thread sets including a superordinate-side processor which has made a context reading request are allowed to conduct synchronization processing by means of the inter-processor interruption notification device 29.

Although in the above-described embodiment, the exclusive control variable 31 is explicitly operated by the exclusive arbitration unit 2021, the exception transfer device 2018 is explicitly operated by the inter-processor interruption notification unit 2025, the synchronization variable 34 is explicitly operated by the subordinate-side context saving completion notification unit 2042 and the subordinate-side context saving completion waiting unit 2029 and furthermore, the completion synchronization variable 35 is explicitly operated by the subordinate-side processor activation completion notification unit 2052 and the subordinate-side processor activation completion waiting unit 2065, in place of all or any of explicit variable operation and device operation, the device may be operated implicitly to each unit by a processor in response to an instruction on synchronization of the processors to conduct synchronization.

Although it is assumed in the above embodiment that the number of threads contained in each thread set is two, the number may be in general an arbitrary integral value n not less than two. In this case, a number n of processors each may be grouped.

As described in the foregoing, the present invention achieves the following effects.

Since exclusive arbitration is conducted so as to temporarily allow only one processor to obtain kernel scheduler execution authority, and a processor which has obtained the kernel scheduler execution authority selects a plurality of threads to be subsequently executed at a time and controls such that a plurality of processors including its own processor execute the threads simultaneously, at a time point where a procedure of the kernel scheduler is completed, a plurality of processors are allowed to start execution of predetermined threads simultaneously.

A plurality of threads can be managed as one unit and execution of the same unit of threads can be started by a plurality of processors simultaneously. The reason is that a plurality of threads to be executed at a time are grouped into one thread set and a context of each thread in the thread set is stored in a context area provided one-to-one corresponding to each thread set at a context save area on a main storage to conduct context switch on a thread set basis.

Even when a plurality of processors are executing different exception processing at a time, each processor is allowed to execute thread switching processing at completely the same time and execute exception processing thereafter. The reason is that a processor which has failed to obtain kernel scheduler execution authority prepares and waits for receiving an inter-processor interruption from a processor which has obtained kernel scheduler execution authority and when receiving an inter-processor interruption, returns exception occurrence conditions waiting to a state prior to the reception of exception, thereby setting such that an exception reoccurs after thread switching.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. In a multi-processor system in which a plurality of threads to be simultaneously executed at a plurality of processors are stored as one thread set at a context area one-to-one corresponding to a thread set provided in a context save area on a main storage, a method of enabling a plurality of processors to start execution of threads simultaneously, wherein exclusive arbitration is conducted during exception processing so as to temporarily allow only one processor among the plurality of processors constituting the multi-processor system to obtain kernel scheduler execution authority, and a processor obtaining kernel scheduler execution authority selects a thread set to be executed next and controls such that a plurality of threads in the selected thread set are executed simultaneously at a plurality of processors including its own processor.

2. The method of enabling a plurality of processors to start execution of threads simultaneously as set forth in claim 1, wherein at said exclusive arbitration, a processor failing to obtain kernel scheduler execution authority prepares and waits for reception of an inter-processor interruption from a processor obtaining kernel scheduler execution authority and when receiving an inter-processor interruption, sets such that an exception reoccurs after thread switching by returning exception generation conditions waiting to a state before the reception of the exception.

3. The method of enabling a plurality of processors to start execution of threads simultaneously as set forth in claim 1, wherein after contexts of a plurality of threads in a thread set are read by the respective processors, arbitration is conducted by means of synchronization means to enable each processor to start thread execution simultaneously.

4. In a multi-processor system in which a plurality of threads to be simultaneously executed at a plurality of processors are stored as one thread set at a context area one-to-one corresponding to a thread set provided in a context save area on a main storage, a method of enabling a plurality of processors to start execution of threads simultaneously, comprising the steps:

(a) of conducting exclusive arbitration during exception processing of each processor so as to temporarily allow only one processor to obtain kernel scheduler execution authority, (b) of a processor obtaining kernel scheduler execution authority to save a context of a thread being executed by its own processor in the context save area on the main storage, as well as issuing a context save request as an inter-processor interruption to a processor executing other thread in the thread set to which the thread in question belongs, (c) of a processor issuing a context save request to, after confirming the completion of context saving at all of the requested processors, issue a context reading request regarding a thread to be executed by other processor in a thread set to be executed next to a processor which is to execute the thread in question, as well as reading a context of a thread to be executed by its own processor in the thread set to be executed next from the context save area on the main storage to return the context, (d) of a processor receiving said context reading request to read a context of the thread to return the context, and (e) upon completion of context return at all the processors executing threads in said thread set, of all the relevant processors to simultaneously start execution of threads.

5. The method of enabling a plurality of processors to simultaneously start execution of threads in a multi-processor system as set forth in claim 4, wherein said context save request is issued at Step (b) by designating a position in the context save area on the main storage.

6. The method of enabling a plurality of processors to simultaneously start execution of threads in a multi-processor system as set forth in claim 5, further comprising the step of a processor receiving an inter-processor interruption related to said context save request to save a context of a thread being executed by its own processor in a designated position of the context save area on the main storage and notify a requesting-side processor of the completion.

7. The method of enabling a plurality of processors to simultaneously start execution of threads in a multi-processor system as set forth in claim 4, wherein a context reading request is made at Step (c) by designating a position of the context save area on the main storage which stores a context of a thread to be executed next.

8. The method of enabling a plurality of processors to simultaneously start execution of threads in a multi-processor system as set forth in claim 7, wherein
   a context is returned at Step (d) by reading a context of the thread from a designated position of the context save area on the main storage.

9. The method of enabling a plurality of processors to simultaneously start execution of threads in a multi-processor system as set forth in claim 4, wherein
   at Step (d), completion of context return is notified to all the processors executing threads in the thread set to which the thread in question belongs.

10. The method of enabling a plurality of processors to simultaneously start execution of threads in a multi-processor system as set forth in claim 4,
   further comprising the step, at said exclusive arbitration at Step (a), of a processor failing to obtain kernel scheduler execution authority to prepare and wait for reception of an inter-processor interruption from a processor obtaining kernel scheduler execution authority and when receiving an inter-processor interruption, set such that an exception reoccurs after thread switching by returning exception generation conditions waiting to a state before the reception of the exception.

11. A system which enables a plurality of processors to start execution of threads simultaneously, comprising:
   means for storing, with a plurality of threads to be simultaneously executed as one thread set, a context of each thread in a thread set at a context area one-to-one corresponding to a thread set provided in a context save area on a main storage, and
   means for conducting exclusive arbitration during exception processing so as to temporarily allow only one processor among the plurality of processors constituting the multi-processor system to obtain kernel scheduler execution authority, wherein
   a processor obtaining kernel scheduler execution authority selects a thread set to be executed next and controls such that a plurality of threads in the selected thread set are simultaneously executed at a plurality of processors including its own processor.

12. In a multi-processor system in which a plurality of threads to be simultaneously executed at a plurality of processors are stored as one thread set at a context area one-to-one corresponding to a thread set provided in a context save area on a main storage, a device which enables a plurality of processors to start execution of threads simultaneously, comprising:
   means for conducting exclusive arbitration during exception processing of each processor so as to temporarily allow only one processor to obtain kernel scheduler execution authority,
   means for a processor obtaining kernel scheduler execution authority to save a context of a thread being executed by its own processor in the context save area on the main storage, as well as issuing a context save request as an inter-processor interruption to a processor executing other thread in the thread set to which the thread in question belongs,
   means for a processor issuing a context save request to, after confirming the completion of context saving at all of the requested processors, issue a context reading request regarding a thread to be executed by other processor in a thread set to be executed next to a processor which is to execute the thread in question,
   means for reading a context of a thread to be executed by its own processor in a thread set to be executed next from the context save area on the main storage to return the context,
   means for a processor receiving said context reading request to read a context of a thread and return the context, and
   mean for, upon completion of context return at all the processors executing threads in said thread set, enabling all the relevant processors to simultaneously start execution of threads.

13. The device which enables a plurality of processors to simultaneously start execution of threads in a multi-processor system as set forth in claim 12, wherein
   said context saving request issuing means issues said context save request by designating a position in the context save area on the main storage.

14. The device which enables a plurality of processors to simultaneously start execution of threads in a multi-processor system as set forth in claim 13,
   further comprising means for a processor receiving an inter-processor interruption related to said context save request to save a context of a thread being executed by its own processor in a designated position of the context save area on the main storage and notify the requesting-side processor of the completion.

15. The device of enabling a plurality of processors to simultaneously start execution of threads in a multi-processor system as set forth in claim 12, wherein
   said context reading requesting means makes a context reading request by designating a position of the context save area on the main storage which stores a context of a thread to be executed next.

16. The device which enables a plurality of processors to simultaneously start execution of threads in a multi-processor system as set forth in claim 12,
   further comprising means for notifying the completion of context return to all the processors executing threads in the thread set to which the thread in question belongs.

17. The device which enables a plurality of processors to start execution of threads simultaneously in a multi-processor system as set forth in claim 12,
   further comprising means for enabling, at said exclusive arbitration, a processor failing to obtain kernel scheduler execution authority to prepare and wait for reception of an inter-processor interruption from a processor obtaining kernel scheduler execution authority and when receiving an inter-processor interruption, return exception generation conditions waiting to a state before the reception of the exception to set such that an exception reoccurs after thread switching.

18. In a multi-processor system in which a plurality of threads to be simultaneously executed at a plurality of processors are stored as one thread set at a context area one-to-one corresponding to a thread set provided in a context save area on a main storage, a computer readable memory for storing a program which enables a plurality of processors to start execution of threads simultaneously,
   said program comprising the steps:
   (a) of conducting exclusive arbitration during exception processing of each processor so as to temporarily allow only one processor to obtain kernel scheduler execution authority,
   (b) of a processor obtaining kernel scheduler execution authority to save a context of a thread being executed by its own processor in the context save area on the main storage, as well as issuing a context save request as an inter-processor interruption to a processor executing other thread in the thread set to which the thread in question belongs, (c) of a processor issuing a context save request to, after confirming the completion of context saving at all of the requested processors, issue a context reading request regarding a thread to be executed by other processor in a thread set to be executed next to a processor which is to execute the thread in question, as well as reading a context of a thread to be executed by its own processor in the thread set to be executed next from the context save area on the main storage to return the context, (d) of a processor receiving said context reading request to read a context of the thread to return the context, and (e) upon completion of context return at all the processors executing threads in said thread set, of all the relevant processors to simultaneously start execution of threads.

19. The computer readable memory for storing a program which enables a plurality of processors to simultaneously start execution of threads in a multi-processor system as set forth in claim 18, wherein at Step (b) said program issues said context save request by designating a position in the context save area on the main storage.

20. The computer readable memory for storing a program which enables a plurality of processors to simultaneously start execution of threads in a multi-processor system as set forth in claim 19, said program further comprising the step of a processor receiving an inter-processor interruption related to said context save request to save a context of a thread being executed by its own processor in a designated position of the context save area on the main storage and notify a requesting-side processor of the completion.

21. The computer readable memory for storing a program which enables a plurality of processors to simultaneously start execution of threads in a multi-processor system as set forth in claim 20, wherein said program makes a context reading request at Step (c) by designating a position of the context save area on the main storage which stores a context of a thread to be executed next.

22. The computer readable memory for storing a program which enables a plurality of processors to simultaneously start execution of threads in a multi-processor system as set forth in claim 21, wherein said program returns a context at Step (d) by reading a context of the thread from a designated position of the context save area on the main storage.

23. The computer readable memory for storing a program which enables a plurality of processors to simultaneously start execution of threads in a multi-processor system as set forth in claim 18, wherein said program at Step (d) notifies the completion of context return to all the processors executing threads in the thread set to which the thread in question belongs.

24. The computer readable memory for storing a program which enables a plurality of processors to simultaneously start execution of threads in a multi-processor system as set forth in claim 18, said program further comprising the step, at said exclusive arbitration at Step (a), of a processor failing to obtain kernel scheduler execution authority to prepare and wait for reception of an inter-processor interruption from a processor obtaining kernel scheduler execution authority and when receiving an inter-processor interruption, set such that an exception reoccurs after thread switching by returning exception generation conditions waiting to a state before the reception of the exception.

* * * * *